United States Patent [19]

Nye et al.

[11] 4,002,024
[45] Jan. 11, 1977

[54] INFRARED SUPPRESSION SYSTEM FOR A GAS TURBINE ENGINE

[75] Inventors: James Leroy Nye, Marblehead; Samuel Rothrock Barr, Swampscott; Thomas Chew, W. Peabody; William Steyer, Ipswich, all of Mass.

[73] Assignee: General Electric Company, Lynn, Mass.

[22] Filed: May 21, 1975

[21] Appl. No.: 579,549

Related U.S. Application Data

[62] Division of Ser. No. 528,797, Dec. 2, 1974, Pat. No. 3,921,906.

[52] U.S. Cl. ................................. 60/262; 60/264; 60/266; 60/271; 60/39.09 P; 239/127.3
[51] Int. Cl.² ........................ F02K 1/02; F02K 3/02
[58] Field of Search ............ 60/39.5, 39.09 P, 264, 60/262, 266, 271; 239/127.3, 265.19

[56] References Cited
UNITED STATES PATENTS

| | | | |
|---|---|---|---|
| 2,651,172 | 9/1953 | Kennedy | 239/127.3 |
| 2,713,990 | 7/1955 | Wosika | 60/39.5 |
| 2,958,188 | 11/1960 | Leitner et al. | 60/266 |
| 3,210,934 | 10/1965 | Smale | 60/39.5 |
| 3,362,155 | 1/1968 | Driscoll | 60/39.09 P |
| 3,586,459 | 6/1971 | Zerlauth | 60/39.16 R |
| 3,603,060 | 7/1952 | Brown | 239/127.3 |
| 3,693,880 | 9/1972 | Versaw et al. | 60/262 |
| 3,766,719 | 10/1973 | McAnally | 60/39.09 P |
| 3,817,030 | 6/1974 | Renius et al. | 60/39.5 |

*Primary Examiner*—Carlton R. Croyle
*Assistant Examiner*—Robert E. Garrett
*Attorney, Agent, or Firm*—Derek P. Lawrence; James W. Johnson, Jr.

[57] ABSTRACT

An infrared suppression system is provided for an aircraft gas turbine engine for reducing the level of emitted infrared radiation from the engine exhaust. The hot exhaust stream emitted from the engine is mixed with the cooling airflows received from a plurality of sources in order to more effectively reduce the level of emitted infrared radiation. In addition, the infrared suppression system prohibits a direct line of sight back into the core engine.

9 Claims, 7 Drawing Figures

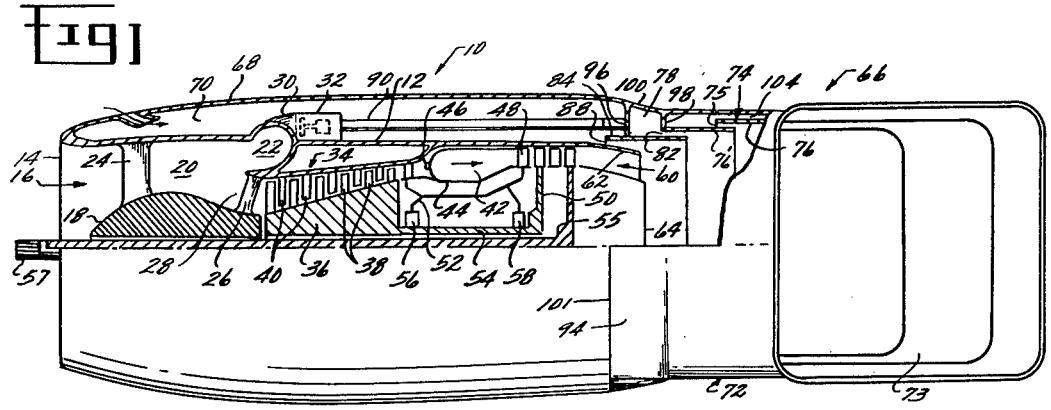

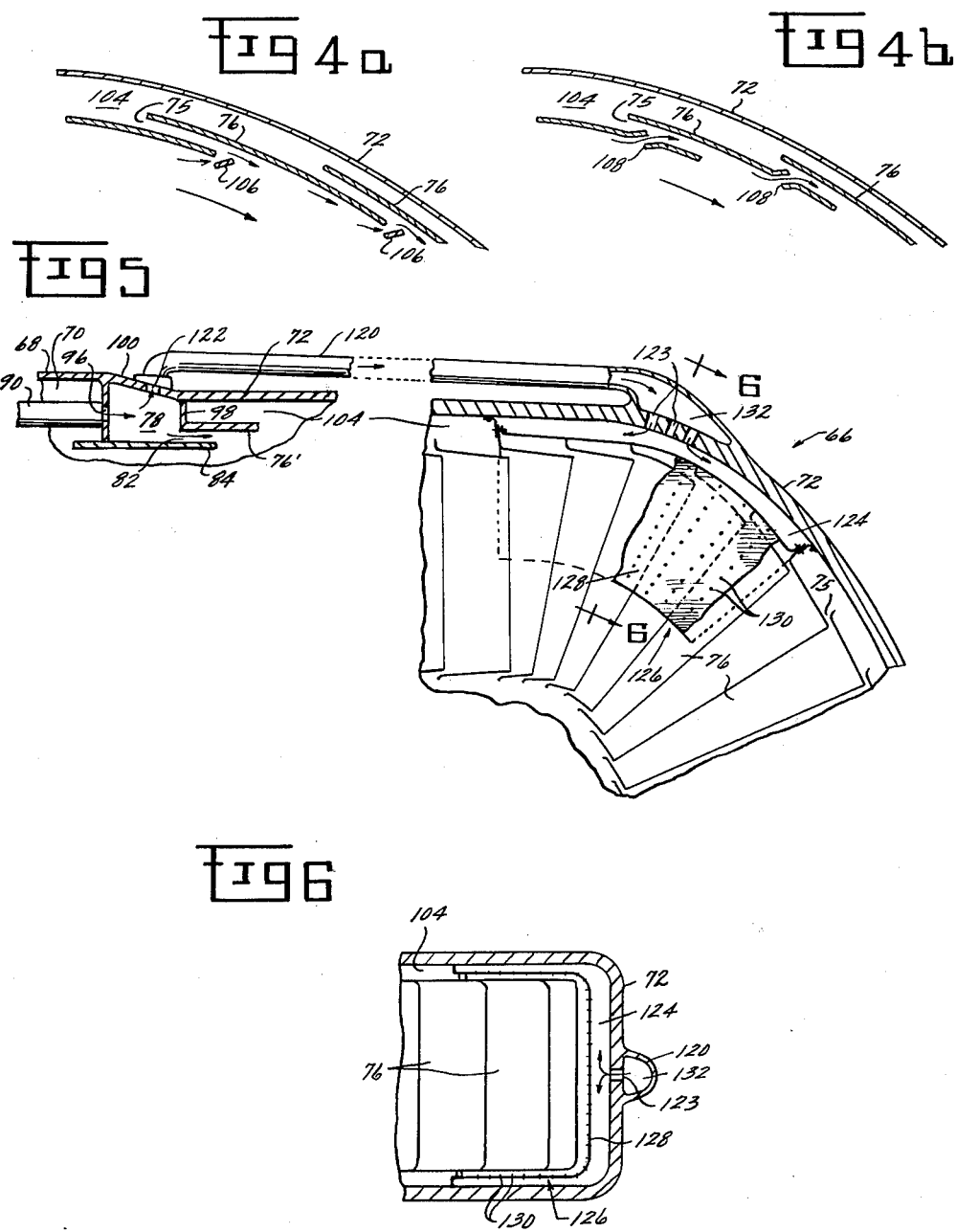

INFRARED SUPPRESSION SYSTEM FOR A GAS TURBINE ENGINE

CROSS REFERENCE TO RELATED APPLICATIONS

This is a divisional application of application, Ser. No. 528,797, filed Dec. 2, 1974, now U.S. Pat. No. 3,921,906 assigned to the assignee of the present invention.

BACKGROUND OF THE INVENTION

This invention relates to an infrared suppression system for a gas turbine engine and, more particularly, to an infrared suppression system for a gas turbine engine wherein three separate sources of airflow are utilized for suppression and a direct line of sight to the core engine is eliminated.

In military aircraft gas turbine engines, it is highly desirable that infrared emissions from the engine be reduced to a practical minimum to avoid acquisition and tracking by heat seeking, hostile forces, or to permit effective countermeasures such as evasive action to be taken against such forces. Infrared suppressors have been utilized in conjunction with aircraft gas turbine engines for reducing the level of infrared radiation emitted from the engine exhaust. Such suppressors, however, have generally utilized only one source of airflow to cool the engine exhaust temperatures. In addition, variable geometry has been used to selectively activate the suppressor and block a direct line of sight into the core engine. Variable geometry, however, increases the weight and complexity of the engine with a corresponding decrease in reliability and overall system performance. Further, such systems have generally included centerplugs or vanes in the exhaust path which decrease engine performance due to a buildup of power turbine back pressure.

Therefore, it is a primary object of this invention to provide a simple and reliable infrared suppression system for an aircraft gas turbine engine wherein the system will operate continuously without having to be selectively actuated by the aircraft pilot.

If is a further object of this invention to provide an infrared suppression system for a gas turbine engine which may be readily detached from the engine when infrared suppression is not desired and readily attached to the engine when infrared suppression is desired.

It is also an object of this invention to provide an infrared suppression system for a gas turbine engine wherein the suppressor blocks any direct line of sight into the core engine without the use of variable geometry.

It is a further object of this invention to provide an infrared suppression system for a gas turbine wherein the suppressor utilizes the cooling airflow from a plurality of sources.

It is also an object of this invention to minimize the power turbine back pressure of gas turbine engines employing infrared suppression systems by eliminating any items in the exhaust path such as vanes or centerplugs.

SUMMARY OF THE INVENTION

These and other objects and advantages will become clearly understood from the following detailed description and drawings, all off which are intended to be representative of, rather than in any way limiting on, the scope of invention. An infrared suppressor for an aircraft gas turbine includes an outer casing. A liner is disposed within the casing for receiving the hot engine exhaust stream including an inlet and outlet through which the hot exhaust stream may respectively enter and exit. The liner is spaced inward from the casing to define a cooling plenum therebetween for receiving a cooling airflow. The liner includes a plurality of slots therein through which the cooling airflow mixes with the hot engine exhaust. An annular manifold ring is provided upstream of the liner and includes an inlet for receiving a second cooling airflow from a source other than the source of cooling airflow to the plenum. The manifold also includes an annular outlet slot through which the cooling airflow is ejected into the hot exhaust stream.

DESCRIPTION OF THE DRAWINGS

While the specification concludes with claims distinctly claiming and particularly pointing out the invention described herein, it is believed that the invention will be more readily understood by reference to the discussion below and the accompanying drawings in which:

FIG. 1 is a side view, partly in cross-section, of a gas turbine engine embodying the infrared suppression system of this invention.

FIG. 2 is an exploded perspective view of the infrared suppressor of this invention.

FIG. 3 is a perspective view of the infrared suppressor of this invention.

FIG. 4A is a cross-sectional view across the line 4—4 of FIG. 3 for an alternate embodiment of the suppressor liner.

FIG. 4B is a cross-sectional view across the line 4—4 of FIG. 3 for another embodiment of the suppressor liner.

FIG. 5 is a fragmented view partially in cross-section of the infrared suppressor of this invention.

FIG. 6 is a cross-sectional view across the line 6—6 of FIG. 5 illustrating the infrared suppressor of this invention.

DESCRIPTION OF THE PREFERRED EMBODIMENT

Referring now to FIG. 1, there is shown a gas turbine engine 10 which includes an outer casing 12 open at the upstream end to provide an airflow inlet 14. Downstream from the inlet 14 there is provided at 16 an integral inlet particle separator of a type fully described in co-pending patent application, Ser. No. 351,622, assigned to the instant assignee. The particle separator 16 includes an axially extending annular passageway 20 defined between an inner fairing 18 and the outer casing 12. A row of circumferentially spaced apart turning vanes 24 extend radially from the inner fairing 18 to the outer casing 12 so as to impart a circumferential turning motion to the inlet airflow. An annular collection chamber 22 is provided to receive the particles of extraneous matter which are centrifuged out of the inlet airstream during engine operation. The particles so removed are then evacuated from the collection chamber 22 through a scavenge duct 30 which is continuously suctioned by means of a blower 32. In this manner particles of sand, dust, water and the like may be removed from the inlet airstream before being ingested by the engine where such particles would cause rapid and destructive erosion.

That portion of the airflow not centrifuged into the collection chamber 22 enters the engine inlet at 28 and is thereafter deswirled by a row of circumferentially spaced apart deswirl vanes 26 which extend radially from the fairing 18. The inlet airflow to the engine is thereafter compressed by a compressor 34 comprising a rotor 36 from which extend a plurality of axially spaced apart rows of rotor blades 38. The rows of rotor blades 38 are interspaced between axially spaced apart rows of stator vanes 40 which may be of the variable type, as is well known in the art. Pressurized air is discharged from the compressor 34 into a combustion chamber 42, defined generally by a combustion liner assembly 44 and receives an inlet flow of fuel through a plurality of circumferentially spaced apart fuel nozzles 46. The high pressure air and fuel mixture is ignited to produce a high energy gas stream which exits from the combustion chamber 42 through a nozzle diaphragm assembly 48.

The high energy gas stream from the nozzle diaphragm assembly 48 then drives a high pressure turbine 50 which connects to the compressor rotor 36 through a shaft 54. The shaft 54 is disposed for rotation relative to an engine frame 52 by a forward and aft bearing housed respectively within a forward sump 56 and an aft sump 58. The high energy gas stream is next directed to drive a power turbine 55 which drivably connects to a power turbine shaft 57.

It will thus be appreciated that the gas turbine engine 10 so far described is of the conventional turboshaft type wherein the power turbine shaft 57 may be connected to drive the rotor blades of a helicopter which is not shown. It will also be appreciated that although a gas turbine engine of the turboshaft has been herein described, other types of gas turbine engines such as a turbofan or turboprop engine may also be suitable for use with the infrared suppression system of this invention.

The hot gas stream is exhausted from the engine 10 through an annular exhaust diffuser 60 defined generally between a centerplug 64 and a fixed outer shroud 62 attached to the aft end of casing 12. Referring now to FIGS. 2 and 3, in conjunction with FIG. 1, there is shown at 66 an infrared suppressor housed within an outer casing 72 having an inlet 71 aligned substantially transverse to the engine center axis and an outlet 73 aligned substantially parallel to the engine center axis and having a geometric precise turning bend formed so as to eliminate any possible direct line of sight from the outlet 73 to the engine exhaust diffuser 60. Infrared suppressor 66 mates with annular exhaust diffuser 60 in the manner hereinafter described to replace the downstream portion of conventional exhaust ducting when infrared suppression is desired. When infrared suppression is no longer desired, infrared suppressor 66 may be detached and replaced with any conventional non-infrared suppression exhaust extension.

An infrared suppression liner 74 is disposed within the casing 72 and spaced inward therefrom to define a cooling plenum 104. The liner 74 comprises a plurality of interleaved rings 76, each one of which is spaced apart in overlapping relation to an adjacent upstream ring so as to define a respective cooling airflow inlet slot 75 therebetween.

The first upstream ring member 76' connects directly to an annular manifold ring 78 defined generally between an upstream annular wall member 96, a downstream wall member 98, an outer circumferential wall member 100, and an inner circumferential ring member 84. The outside periphery of the downstream wall member 98 extends outward beyond the outer circumferential wall member 100 so as to nest within a portion of the inlet 71 to the casing 72. The manifold 100 receives an inlet cooling airflow through an inlet port 80 which is connected to receive the outlet blower 32 airflow from the integral inlet particle separator 32 by way of an interconnecting conduit 90. The cooling airflow is thereafter rejected from the manifold 78 into the hot exhaust stream through an annular outlet slot 82 defined between the interior ring member 84 and the inside edge of the downstream wall member 98.

The infrared suppressor 66 is connected to the downstream edge of an aircraft engine nacelle 68 by way of a transition cowl 92, the upstream edge 101 of which is contoured to mate with the downstream edge of the nacelle 68. The transition cowl 92 has a downstream edge 102 which overlaps the outside periphery of the wall member 98 and serially abuts a portion of the inlet 71 to the casing 72. In this manner, the outside surface of the aircraft engine nacelle 68 is gradually faired into the infrared suppressor casing 72 in a smooth and uniform manner so as not to affect any undue aerodynamic disturbances about the outer profile.

As is readily apparent, the downstream edge 102 of the transition cowl 92 mates with only a portion of the upstream edge of the inlet 71. That portion of the inlet 71 extending beyond the periphery of the cowl 92 provides an opening for the inlet of ambient cooling ram airflow to the plenum 104. The inlet flow of ambient cooling ram air to the plenum 104 may be facilitated by a ram air scoop 94 which abuts the outside surface of the transition cowl 92 and is in substantial coaxial alignment with that portion of the edge of inlet 71 extending beyond the periphery of the transition cowl.

During engine operation the level of emitted infrared radiation is reduced in the following manner. Ambient airflow is continuously admitted in a conventional manner to the annular bay area 70 between the engine casing 12 and the outer aircraft engine nacelle 68. The engine bay cooling airflow normally operates to reduce the temperature of the aircraft engine nacelle 68 relative to the engine casing 12 and has heretofore been dumped overboard without further use made thereof. The infrared suppression system of this invention, however, further utilizes the engine bay cooling airflow by directing it through an annular ejection slot 88 as defined between the interior ring member 84 and the exhaust extension 62. In this manner, the engine bay cooling airflow is mixed with the hot gas stream exhausting from the diffuser 60 so as to reduce the overall temperature of the gas stream and interior ring member 34 thereof. In like manner, the airflow from the integral particle separator blower 32 is ducted rearwardly to the manifold ring 78 from whence it is continuously discharged into the hot gas stream through the annular outlet slot 82. In this manner, a second source of cooling airflow which would likely have been dumped overboard is used to further reduce the temperature of the first interior ring member 76 and of the 101 exhaust stream. airflow The ram air scoop 94 operates to capture a portion of the cool ambient airstream around the engine nacelle 68 in order to direct the cooling airflow to the plenum 104 from whence it is ejected into the hot exhaust stream through the plurality of inlet slots 75 as defined between the overlapping rings 76. In this manner, a third source of cooling airflow is ejected into the hot exhaust stream to even further reduce the level of emitted infrared radiation from the engine annular exhaust diffuser 60. The cooling air flow captured by the ram air scoop 94 operates to reduce the temperatures of the hot metal components as well as the hot exhaust stream. Also, the sizes of the inlet slots 75 may be easily adjusted to control the flow and distribution of the cooling inlet airflow in a desired manner.

Referring now to FIGS. 4a and 4b, there are shown alternate arrangements for the suppression liner 74 in the area of curvature where increased static pressures in the areas adjacent the slots 75 may lead to a backflow of the hot exhaust stream into the cooling plenum 104. FIG. 4a shows the addition of a plurality of extension louvers 106 which operate to entrain the boundary layer flow of the hot gas stream so as to increase the velocity of the flow immediately aft of the inlet slots 75 and thus decrease the static pressure in the area adjacent the slot. This, in turn, operates to reduce the large backflow differential pressures which might otherwise occur. FIG. 4b shows an alternate arrangement for reducing or eliminating the backflow into the cooling plenum 104 whereby a plurality of ejector slots 108 are provided adjacent the trailing edges of the individual rings 76.

Referring to FIGS. 5 and 6 in conjunction with FIGS. 1, 2 and 3, therein is shown another feature of the invention wherein additional cooling air is ducted to a pressurized plenum which partially encloses the backside of rings 76 and which is located generally at the outer circumferential bend 126 in the infrared suppressor 66. A portion of the cooling air from the integral inlet particle separator blower 32 which flows into manifold 78 is directed through a conduit 120 via an aperture 122 in wall member 100 into a manifold 132 formed at the outer bend in casing 72. The cooling air thereafter flows through a plurality of apertures 123 in casing 72 to the plenum 124. Plenum 124 is formed by a wall member 128 and the inner wall of casing 72. A plurality of apertures are provided in wall member 128 in order to permit the cooling air in plenum 124 to reach the rings 76. While cooling air for the plenum 124 is illustrated as derived from the integral inlet particle separator blower 32, it will be obvious to those skilled in the art that conduit 120 may be placed in flow communication with any other suitable sources of cooling air such as an externally driven blower.

From the foregoing it will be appreciated that the present invention provides an efficient means for mixing the cooling airflow received from separate sources with the hot exhaust stream so as to more efficiently reduce the temperature level of the hot metal surfaces of an infrared suppressor and hot exhaust gases exiting therefrom and thereby reduce the level of emitted infrared radiation from the engine exhaust. In addition, any direct line of sight through the infrared suppressor to the core engine has also been eliminated in a simple manner without the use of variable geometry hardware.

Accordingly, while preferred embodiments of the present invention have been depicted and described, it will be appreciated by those skilled in the art that many modifications, substitutions and changes may be made thereto without departing from the invention's fundamental theme. For example, it will be readily appreciated that the infrared suppression system of this invention could be utilized with a gas turbine engine that does not have an integral particle separator and that another source of cooling airflow could be substituted in place of the particle separator air-flow. Likewise, it will be appreciated that the invention is not restricted to a suppression system cooled from three separate sources of cooling airflow, but may include a lesser number of sources of cooling airflow depending upon the degree of infrared suppression desired. Thus having described preferred embodiments of the invention, though not exhaustive of all possible equivalents, what is desired to be secured by Letters Patent is distinctly claimed and particularly pointed out in the claims appearing below.

What is claimed is:

1. An infrared suppression system for an aircraft gas turbine engine of the type having an integral inlet particle separator including a particle collection chamber and blower for evacuating said chamber, comprises:
    means for directing the airflow from the integral inlet particle separator blower to the hot engine exhaust stream for mixing therewith,
    means for capturing a portion of the ambient ram airflow around the engine and directing it to the hot engine exhaust stream for mixing therewith, and
    wherein the engine is housed within an aircraft engine nacelle so as to define an annular bay area therebetween and cooling airflow is admitted to the bay area to cool the aircraft engine nacelle after which said bay cooling airflow is directed to the hot engine exhaust stream for mixing therewith.

2. The infrared suppression system of claim 1 wherein the means for directing the separator blower airflow to the hot engine exhaust system includes:
    an annular manifold ring having an inlet port for receiving the inlet airflow from the separator blower and an annular outlet slot through which the cooling airflow is ejected into the hot engine exhaust stream exiting from the engine exhaust nozzle, and a conduit interconnecting the separator blower to the manifold ring inlet.

3. The infrared suppression system of claim 2 wherein the manifold ring is defined generally between an upstream annular wall member, a downstream wall member, and an inner circumferential ring member with the inside edge of the downstream wall member spaced apart from the ring member so as to define the annular outlet slot from the manifold, and wherein the inner ring member is spaced apart from the downstream end of the engine to define an annular outlet slot therebetween which provides the means by which the bay cooling airflow is mixed with the hot engine exhaust stream.

4. The infrared suppression system of claim 1 wherein the means for capturing a portion of the ambient ram airflow around the engine and directing it to the hot engine exhaust stream includes:
    a ram air scoop extending outward to the aircraft engine nacelle into the ambient airstream,
    an outer casing for receiving the hot engine exhaust stream, and
    a liner disposed within the casing and spaced inward therefrom to define a cooling plenum therebetween in flow communication with the ram air scoop for receiving the ambient ram airflow therefrom and further including a plurality of slots therein through which the ambient cooling airflow mixes with the hot engine exhaust.

5. The infrared suppression system of claim 1 wherein the liner comprises a plurality of interleaved rings, each one of which is spaced apart in overlapping relation relative to an adjacent upstream ring so as to define a respective annular cooling airflow inlet flow therebetween.

6. The infrared suppression system of claim 1 wherein the means for directing the separator blower airflow to the hot engine exhaust stream includes an annular manifold ring in flow communication with the separator blower, said manifold ring having an annular outlet slot through which the blower cooling airflow is ejected into the hot engine exhaust stream, together with an inner circumferential ring member spaced apart from the downstream end of the engine to define an annular outlet slot therebetween through which the bay cooling airflow is mixed with the hot engine exhaust stream, and wherein the means for capturing a portion of the ambient ram airflow around the engine and directing it to the hot engine exhaust stream includes a ram air inlet in flow receiving relation to the ambient airstream together with an outer casing for receiving the hot engine exhaust stream and a liner disposed within the casing and spaced inward therefrom to define a cooling plenum therebetween in flow communication with the ram air inlet whereby ambient ram airflow is introduced into the hot engine exhaust stream through a plurality of slots in the liner.

7. The infrared suppression system of claim 6 wherein the outer casing is connected to the downstream end of the aircraft engine nacelle by a transition cowl, the upstream edge of which is contoured to mate with the downstream edge of the nacelle and the downstream edge of which is in abutment with a portion of the inlet to the outer casing so as to gradually face the outside surface of the aircraft nacelle into the outer casing wherein the remaining portion of the outer casing inlet extends beyond the periphery of the cowl to provide an opening for the inlet of ambient cooling ram airflow to the cooling plenum.

8. The infrared suppression system of claim 2 wherein the infrared suppressor is in downstream serial flow relation to the engine exhaust nozzle and includes a housing having an inlet for receiving hot engine exhaust stream from the engine exhaust nozzle and an outlet through which the hot exhaust stream exits from the housing wherein the outlet is angled with respect to the inlet so as to eliminate any possible direct line of sight from the outlet of the infrared suppressor casing to the engine exhaust nozzle.

9. The infrared suppression system of claim 8 wherein the inlet to the infrared suppressor casing is aligned substantially transverse to the engine center axis and the outlet is aligned substantially parallel to the engine center axis.

* * * * *